(12) United States Patent
Kim

(10) Patent No.: US 7,061,550 B2
(45) Date of Patent: Jun. 13, 2006

(54) COLOR WHEEL INDEX ALIGNING DEVICE AND ALIGNMENT METHOD THEREOF

(75) Inventor: Ik-song Kim, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 547 days.

(21) Appl. No.: 10/614,815

(22) Filed: Jul. 9, 2003

(65) Prior Publication Data

US 2004/0125242 A1 Jul. 1, 2004

(30) Foreign Application Priority Data

Dec. 28, 2002 (KR) ............... 10-2002-0086116

(51) Int. Cl.
 *H04N 9/12* (2006.01)
(52) U.S. Cl. ............... 348/743; 348/771; 345/84
(58) Field of Classification Search ............... 348/743, 348/742, 771, 764, 658, 180, 191, 68; 250/233, 250/226; 345/84, 85; H04N 9/12
See application file for complete search history.

(56) References Cited

U.S. PATENT DOCUMENTS

| | | | | |
|---|---|---|---|---|
| 5,691,780 A | * | 11/1997 | Marshall et al. | 348/743 |
| 5,706,061 A | * | 1/1998 | Marshall et al. | 348/743 |
| 5,967,636 A | * | 10/1999 | Stark et al. | 353/84 |
| 6,084,235 A | * | 7/2000 | Breithaupt et al. | 250/233 |
| 6,108,053 A | * | 8/2000 | Pettitt et al. | 348/743 |
| 6,535,187 B1 | * | 3/2003 | Wood | 345/84 |
| 6,738,104 B1 | * | 5/2004 | Marshall | 348/743 |

FOREIGN PATENT DOCUMENTS

| | | |
|---|---|---|
| JP | 8-51638 A | 2/1996 |
| JP | 9-23444 A | 1/1997 |

* cited by examiner

*Primary Examiner*—Michael H. Lee
(74) *Attorney, Agent, or Firm*—Sughrue Mion, PLLC

(57) ABSTRACT

A color wheel index aligning apparatus for a projection display apparatus and an alignment method thereof. The color wheel index aligning apparatus has a signal supply unit for supplying a predetermined image signal to the display apparatus, a color detection unit for detecting the color of the image signal output to the screen, a storage unit for storing a color coordinate value, and a control unit for measuring the color coordinate of the color detected at the color detection unit based on the color coordinates stored in the storage unit, and using the measured color coordinate value, providing the display apparatus with an alignment value for aligning the color wheel index. Increasing and decreasing the delay time of the output timing of an R, G and B color signal in correspondence with the increase and decrease of the alignment value, the display apparatus automatically adjusts aligns the color wheel index.

10 Claims, 5 Drawing Sheets

COLOR WHEEL INDEX ALIGNING DEVICE AND ALIGNMENT METHOD THEREOF

BACKGROUND OF THE INVENTION

This application claims the priority of Korean Patent Application No. 2002-86116, filed Dec. 28, 2002, in the Korean Intellectual Property Office, which is incorporated herein by reference in its entirety.

1. Field of the Invention

The present invention relates to a projection display apparatus using a color wheel such as a digital light processing projection television, and more particularly to a color wheel index aligning apparatus and an alignment method thereof.

2. Description of the Related Art

Generally, a projection display apparatus such as a digital light processing projection television uses a color wheel in order to separate light from a light source into color lights, in which a desired color is properly displayed on a screen of the display apparatus only when the reference color of the color wheel aligns with the color of the image signal processed at the projection display apparatus.

A reference point is indicated on the color wheel for aligning the respective starting positions of a corresponding image signal and the color wheel. A detection element is provided to detect the reference point. A reference point signal, the resultant signal of detecting the reference point, is provided to the image signal processor, and accordingly, the color of the image signal is made to align with the separated color from the color wheel by delaying the corresponding image signal at the image signal processor.

However, the respective positions of the detection element and the reference point of the color wheel often vary in respective lots due to errors made during an assembling process. Conventionally, in order to compensate for such variance, a delay of a color wheel index was manually adjusted by slightly varying the mounting position of the detection element. Since this method relies on the guesswork of the adjusting person, alignment was sometimes inaccurate if the adjuster changes, or due to various changes in surrounding conditions. Another problem was that it took a lengthy time for the alignment process.

SUMMARY OF THE INVENTION

Consistently, it is an aspect of the present invention to provide a color wheel index aligning apparatus which shortens the alignment time and improves accuracy of alignment through the automation of a color wheel index alignment process of a digital light processing (DLP) projection display apparatus and an alignment method thereof.

In order to achieve the above aspects and/or features of the present invention, a color wheel index aligning apparatus for a display apparatus having a color wheel as a color separator includes a signal supply unit which supplies a predetermined image signal to the display apparatus, the predetermined image signal being processed at the display apparatus and output to a screen, a color detection unit which detects the color of an image signal output to the screen, a storage unit which stores color coordinates with respect to red, green and blue colors, and a control unit which measures a color coordinate value of the color detected at the color detection unit based on the color coordinates stored in the storage unit, and using the measured color coordinate value, providing the display apparatus with an alignment value for aligning a color wheel index.

The above aspects are additionally achieved with a color wheel index aligning apparatus for a display apparatus having a color wheel as a color separator, comprising means for supplying a predetermined image signal to the display apparatus, the predetermined image signal being processed at the display apparatus and output to a screen, means for detecting the color of an image signal output to the screen, means for storing color coordinates with respect to red, green and blue colors, and means for measuring a color coordinate value of the color detected at the color detection means based on the color coordinates stored in the storage means, and using the measured color coordinate value, providing the display apparatus with an alignment value for aligning a color wheel index.

The signal supply unit supplies at least one of the image signal of red, green and blue colors, and the control unit adjusts the alignment value based on the color coordinate value of one of the image signals of red, green and blue colors being supplied from the signal supply unit.

The control unit compares a first color coordinate value with respect to the color of the image signal currently output to the screen and a second color coordinate value with respect to the color of the image signal previously output to the screen, and when the first color coordinate value is equal to, or greater than the second color coordinate value, the control unit increases and decreases the alignment value and provides the display apparatus with the alignment value.

The display apparatus includes an image signal processor for processing the supplied predetermined image signal into R, G and B color signals and outputting the processed R, G and B color signals, and a system control unit for controlling an output timing of the R, G and B color signals from the image signal processor. The system control unit controls the image signal processor to increase and decrease the delay time of the output timing for the R, G and B color signals in correspondence with the increased and decreased alignment value provided from the control unit.

Consistent with the present invention, an alignment method of a color wheel index aligning apparatus which is for a display apparatus having a color wheel as a color separator, includes a signal supply step for supplying a predetermined image signal to the display apparatus, a display step for processing the predetermined image signal and outputting the processed signal to a screen of the display apparatus, a color detection step for detecting the color of the image signal output to the screen of the display apparatus, an adjusting step for measuring the color coordinate value of the color detected in the color detection step based on the pre-stored color coordinates, and using the measured color coordinate value, aligning and adjusting an alignment value for aligning a color wheel index, and a providing step for providing the display apparatus with the alignment value adjusted in the adjusting step.

Also consistent with the present invention, an alignment method of a color wheel index aligning apparatus which is for a display apparatus having a color wheel as a color separator, comprising supplying a predetermined image signal to the display apparatus, processing the predetermined image signal and outputting the processed signal to a screen of the display apparatus, detecting the color of the image signal output to the screen of the display apparatus, measuring the color coordinate value of the color detected in the color detection step based on the pre-stored color coordinates, and using the measured color coordinate value, aligning and adjusting an alignment value for aligning a color wheel index, and providing the display apparatus with the alignment value adjusted in the adjusting step.

In the signal supply step, at least one of the image signal of red, green and blue colors is supplied, and in the adjusting step, the alignment value is adjusted based on the color coordinate value of one of the image signal of red, green and blue colors being supplied in the signal supply step.

The adjusting step includes the comparing step of comparing a first color coordinate value with respect to the color of the image signal currently output to the screen and a second color coordinate value with respect to the color of the image signal previously output to the screen, and the increasing/decreasing step of, when the first color coordinate value is equal to, or greater than the second color coordinate value, increasing and decreasing the alignment value.

The display step includes the output step of processing the supplied predetermined image signal into R, G and B color signals, and outputting the processed R, G and B color signals, and the output step increases and decreases the delay time of the output timing for the R, G and B color signals in correspondence with the increase and decrease of the alignment value.

As the delay of the output timing of the R, G, B color signals from the image signal processor is adjusted in synchronization with the periodicity of the R, G, B color beams which are separated through the color wheel, the index of the color wheel is adjusted automatically. Accordingly, the adjustment process is automated, and adjustment time for color wheel index processing is shortened. As a result, mass production is carried out more efficiently. Furthermore, since a possible error from the manual adjustment or the variations in respective sets can be avoided, adjustment accuracy improves.

BRIEF DESCRIPTION OF THE DRAWINGS

The above aspects and other features of the present invention will become more apparent by describing in detail an exemplary embodiment thereof with reference to the attached drawings, in which.

DETAILED DESCRIPTION OF AN EXEMPLARY EMBODIMENT

Hereinafter, the present invention will be described in detail with reference to the accompanying drawings.

Figure 1:
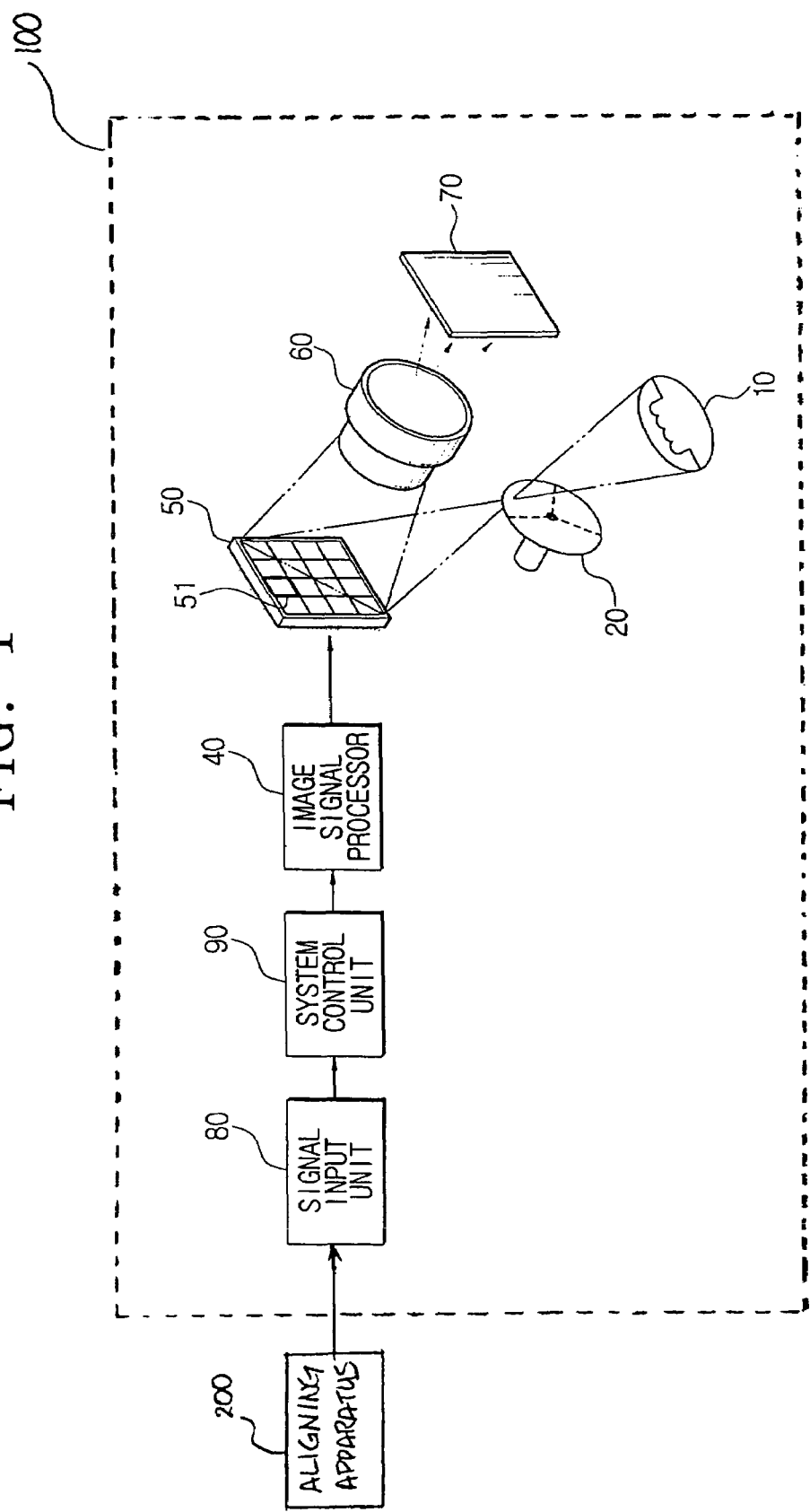
FIG. 1 is a schematic block diagram of a projection display apparatus and of a color wheel index aligning apparatus consistent with the present invention.

FIG. 1 is a schematic block diagram of the projection display apparatus 100, which includes a light source 10, a color wheel 20, an image signal processor 40, a display element 50, a projection lens 60, a screen 70, a signal input unit 80, and a system control unit 90.

The light source 10 includes a lamp such as a metal halide lamp to generate a white light.

The color wheel 20, has 3 or 3n of red, green and blue color filters arranged at uniform intervals to selectively pass corresponding color beams from the light source 10.

The image signal processor 40 processes image signals. That is, the image signal processor 40 includes an analog-to-digital (AD) converter (not shown) that digitalizes an analog image signal, and a luminance/chrominance (Y/C) separator that processes and separates an image signal into an R, G, B color signal and separates a brightness signal from the R, G, B color signal.

The display element 50 includes a spatial light modulator (SML) such as, inter alia, a digital micromirror device (MD).

The light is emitted from the light source 10 into the color wheel 20, and due to the rotating of the color wheel 20, R, G, B color beams are sequentially illuminated onto the display element 50 (hereinafter briefly called 'DMD'), and as a result, a color image signal is realized. Based on the R, G, B color beams from the color wheel 20, an R, G, B color signal processed at the image signal processor 40 is sequentially input to the DMD 50. Micro-mirrors 51, which are arranged in the DMD 50 in correspondence with the respective pixels, are inclined a predetermined angle according to the input image signal, and the color beams from the color wheel 20 are reflected from the micro-mirrors 51 to fall incident on the projection lens 60.

Then as the color beams, magnified by the projection lens 60, are formed on the screen 70, realization of the color image signal is completed. As described above, the image signal is displayed on the screen 70 with the synchronization of the incident R, G, B color beams on the DMD 50 and the R, G, B color signal.

The signal input unit 80 receives an input of a predetermined signal from an external device. That is, the signal input unit 80 receives an input of the R, G, B color signal and a predetermined control signal from the color wheel index aligning apparatus 200.

The system control unit 90 controls overall operation of the system of the projection display apparatus. In other words, the system control unit 90 aligns the color wheel index of the projection display apparatus in accordance with the predetermined control signal input from the color wheel index aligning apparatus 200.

Figure 2:
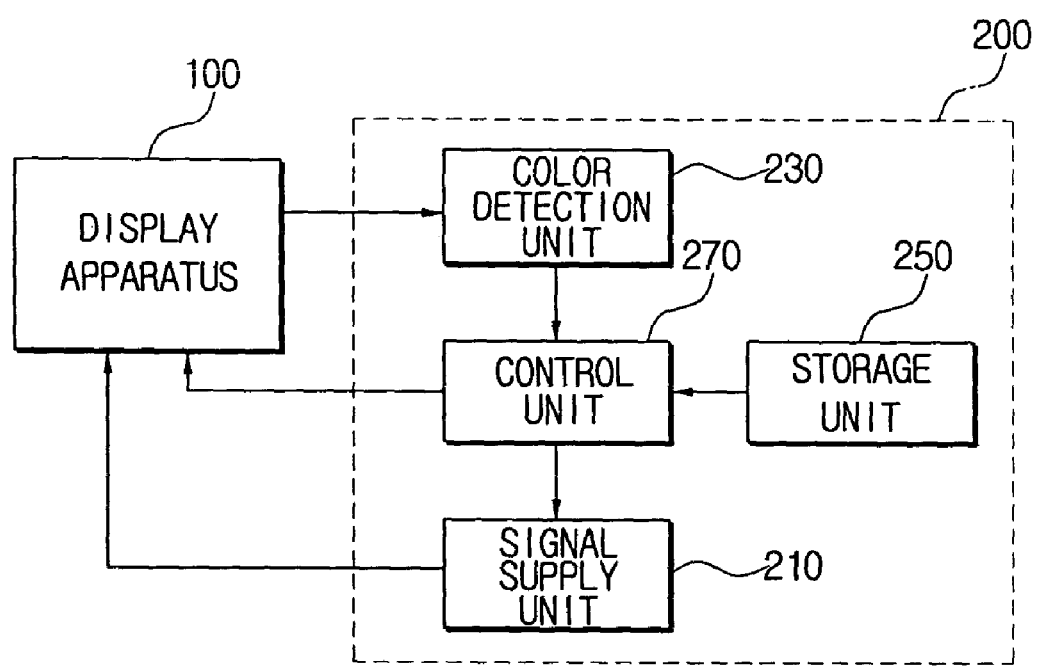
FIG. 2 is a schematic block diagram of a color wheel index aligning apparatus consistent with the present invention.

FIG. 2 is a schematic block diagram of the color wheel index aligning apparatus 200 according to the present invention, illustrating the color wheel index aligning apparatus 200 being connected with the projection display apparatus 100.

The color wheel index aligning apparatus 200 includes a signal supply unit 210, a color detection unit 230, a storage unit 250 and a control unit 270.

The signal supply unit 210 supplies to the projection display apparatus 100 at least one of the R, G, B color signals for aligning the color wheel index of the projection display apparatus 100.

The color detection unit 230 detects the color of the image signal being output through the screen of the projection display apparatus 100. The color detection unit 230 may be, for one example, a photo sensor.

Figure 3:
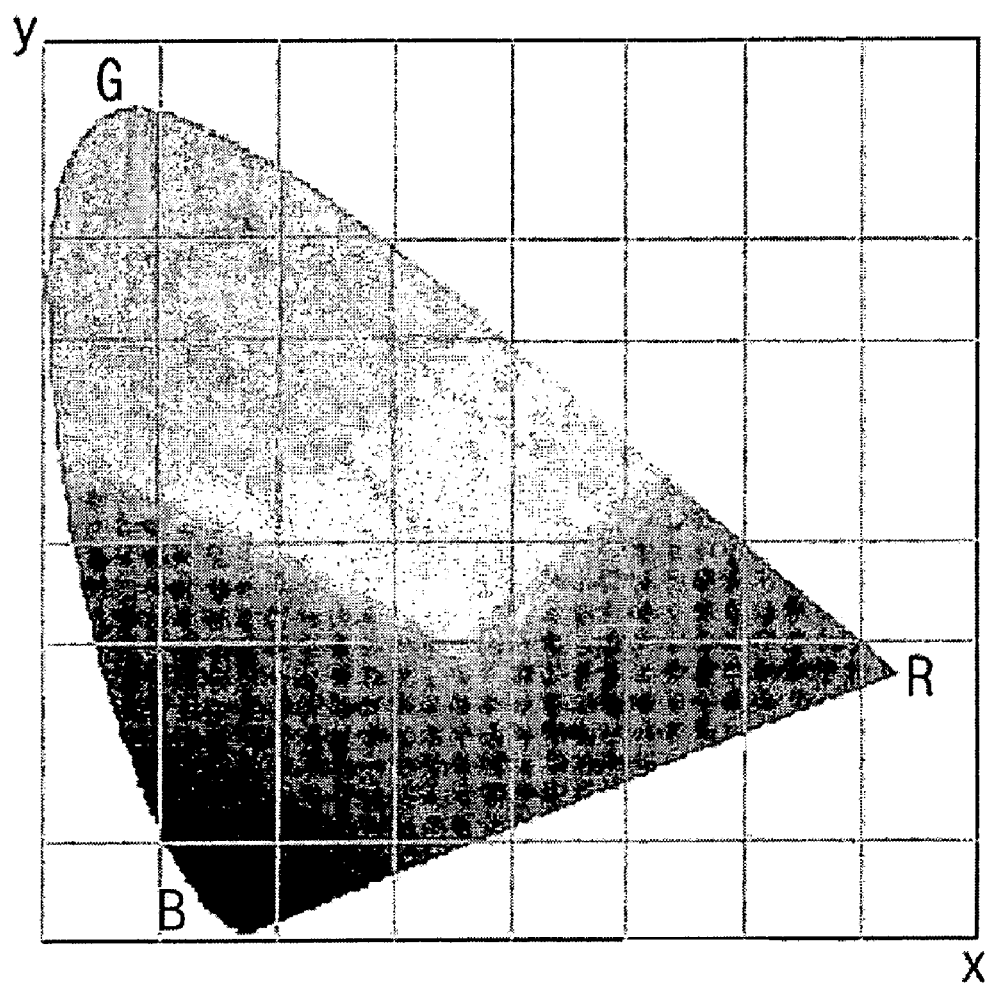
FIG. 3 is a view illustrating an International Commission on Illumination (CIE) coordinate system being stored in a storage unit of FIG. 2.

The storage unit 250 stores a CIE color coordinate system as shown in FIG. 3, which has predetermined coordinates (X, Y) corresponding to the R, G, B colors. The coordinates of the CIE coordinate system of FIG. 3 have the following characteristics. The R signal has maximum X coordinate value and minimum Y coordinate value, the G signal has a minimum X coordinate value and maximum Y coordinate value, and B signal has a minimum X coordinate value and minimum Y coordinate value.

The control unit 270 compares the color of the image signal on the screen which is detected at the color detection unit 230, with the CIE coordinates stored in the storage unit 250, and accordingly increases and decreases the adjustment of the color wheel index. More specifically, the control unit 230 compares the first color coordinates of the color of the image signal currently output on the screen 70, with the second color coordinates of the color of the image signal previously output on the screen 70. If the first color coordinates are greater than the second color coordinates, the adjustment is accordingly increased or decreased and provided to the display apparatus.

Figure 4A:
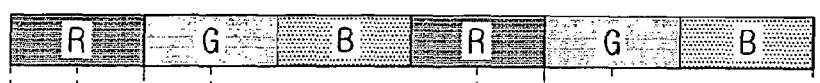
FIGS. 4A to 4D are views illustrating the states where the color wheel index is not aligned.
Figure 4B:
Figure 4C:
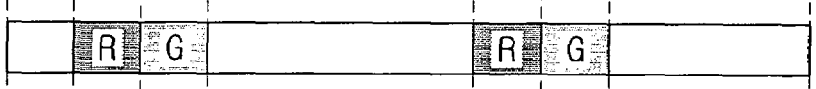
Figure 4D:
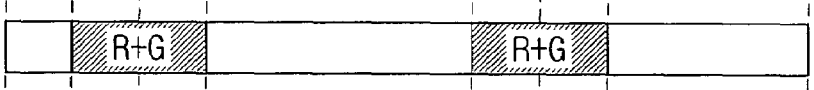
Figure 5:
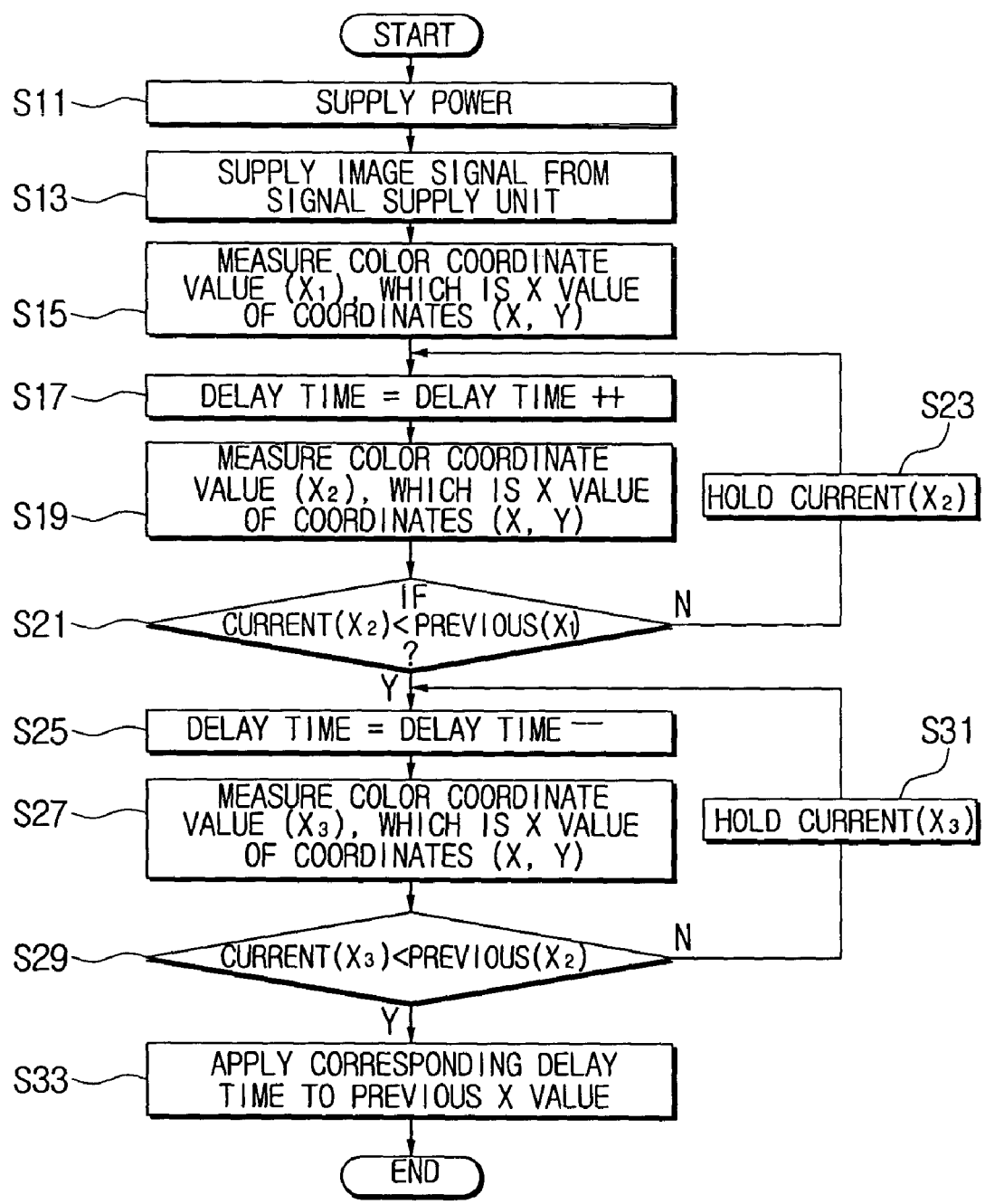
FIG. 5 is a flowchart illustrating an aligning method of the color wheel index aligning apparatus consistent with the present invention.

Referring to FIG. 5, a flowchart illustrating a method for aligning a color wheel index according to the present invention, and additionally referring to FIGS. 3 and 4A, 4B, 4C and 4D, a method for aligning the color wheel index will be described below.

FIGS. 4A, 4B, 4C and 4D illustrate some exemplary cases where the color wheel index is not aligned.

More specifically, FIG. 4A illustrates R, G, B color beams being repeatedly and periodically output from the color wheel 20 according to a predetermined cycle. The image processor 40 delays an output timing of the image signal by a predetermined time, i.e., according to the reference point signal detected by the detection element (not shown) that detects the reference point (not shown) indicated on the color wheel 20. At this time, the respective positions of the detection element (not shown) and the reference point of the color wheel 20 vary in each lot, or according to the errors made during the assembling process.

FIG. 4B illustrates an R color signal from the image signal processor 40 being misaligned from the output timing of the R, G, B color beams from the color wheel 20. FIG. 4C illustrates the misalignment of the R color signal input to the DMD 50 and the R color beam output from the color wheel 20. FIG. 4D illustrates a subsequent display of the image signal on the screen 70 in a mixture of R and G color beams.

When the color wheel index is misaligned due to errors of the reference point signal, the projection display apparatus 100 is connected with the color wheel index aligning apparatus 200. Then, power is supplied to the system for color wheel index alignment, i.e., to the projection display apparatus 100 and the color index aligning apparatus 200 in operation S11.

The control unit 270 of the color wheel index aligning apparatus 200 controls the signal supply unit 210 to supply a predetermined color signal, for example an R signal, to the projection display apparatus 100. At this time, an R image signal is input through the signal input unit 80 of the projection display apparatus 100 in operation S13. The R image signal is processed at the image signal processor 40 into an R signal, and input to the DMD 50.

At this time, as shown in FIG. 4D, an image signal of a mixture of R and G is output.

The color detection unit 230, detecting the R+G color, provides the control unit 270 with the data about the color of the image signal being currently output through the screen 70.

The control unit 270 in operation S15 measures X coordinate value $X_1$ to correspond to the mixture of R+G color based on the CIE color coordinates (X, Y) stored in the storage unit 250.

Next, the control unit 270 goes on into a preparation stage for the color wheel index alignment, with the first operation, which increases a delay time for the output timing of the R color signal, i.e., the alignment value, from the image signal processor 40.

The output timing of the R color signal, which is output from the image signal processor 40 and incident on the DMD 50, is delayed by a predetermined time in operation S17. The R color signal is input to the DMD 50 according to the delayed output timing, and accordingly, after the DMD 50 and the projection lens 60, the image signal corresponding to the delayed R color signal is output through the screen 70. The color detection unit 230 detects the color of the output image signal on the screen 70, and the control unit 270 measures the X coordinate value $X_2$ corresponding to the detected color of the image signal based on the CIE color coordinates stored in the storage unit 250.

The control unit 270 in operation S21 compares the currently measured X coordinate value $X_2$ with the previously measured X coordinate value $X_1$. When the currently measured X coordinate value $X_2$ is equal to, or greater than the previously measured X coordinate value $X_1$, the control unit 270 holds the currently measured X coordinate value $X_2$ in operation S23, and lengthens the delay time in operation S17.

Meanwhile, when the currently measured X coordinate value $X_2$ is smaller than the previously measured X coordinate value $X_1$, as a next stage, a second operation of shortening the delay time is performed.

More specifically, the control unit 270 decreases a delay time corresponding to the currently measured X coordinate value $X_2$ by a predetermined time in operation S25. Then through the same processes as described above, the color coordinate value corresponding to the color of the image signal displayed on the screen 70, i.e., an X coordinate value $X_3$ is measured in operation S27.

The control unit 270 compares the currently measured X coordinate value $X_3$ with the previously measured X coordinate value $X_2$ in operation S29. When the currently measured X coordinate value $X_3$ is equal to, or greater than the previously measured X coordinate value $X_2$ as a result of comparison, the control unit 270 holds the currently measured X coordinate value $X_3$ in operation S31, and decreases the delay time in operation S25.

Meanwhile, when the currently measured X coordinate value $X_3$ is smaller than the previously measured X coordinate value $X_2$ as a result of comparison, the control unit 270 provides a system control unit 90 of the projection display apparatus 100 with a delay time corresponding to the previously measured X coordinate value $X_2$.

The system control unit 90 applies the delay time provided from the control unit 270, and accordingly, it delays the output timing of the image signal, i.e., of the R signal being output from the image signal processor 40 and input to the DMD 50 according to the delay time in operation S33.

In the above description, the case of supplying an R signal from the signal supply unit 210 to align the color wheel index has been described. However, it will be understood that the other signals, i.e., G or B signal can also be supplied for the purpose of color wheel index alignment. Furthermore, the first operation of increasing and the second operation of decreasing the delay time in the alignment of the color wheel index can be performed in opposite order.

Since the R, G, B color beams separated at the color wheel 20 are synchronized with the image signals, i.e., with the R, G, B signal processed at the image signal processor 40 and input to the DMD 50, index of the color wheel 20 is aligned automatically.

Consistent with the present invention, by controlling whether or not to delay the output timing of the R, G, B color signal from the image signal processor in accordance with the cycle of the R, G, B color beams separated at the color wheel 20, index of the color wheel 20 can be aligned automatically.

As the alignment process is automated, alignment time during the manufacturing process is shortened. Also, as the possibility of having an error in alignment due to changes in adjuster or variances of each set is minimized, precise alignment is guaranteed.

Although a few exemplary embodiments of the present invention have been described, it will be understood by those skilled in the art that the present invention should not be limited to the described exemplary embodiments, but various changes and modifications can be made within the spirit and scope of the present invention as defined by the appended claims.

What is claimed is:

1. A color wheel index aligning apparatus for a display apparatus having a color wheel as a color separator, comprising:
   a signal supply unit which supplies a predetermined image signal to the display apparatus, the predetermined image signal being processed at the display apparatus and output to a screen;
   a color detection unit which detects the color of an image signal output to the screen;
   a storage unit which stores color coordinates with respect to red, green and blue colors; and
   a control unit which measures a color coordinate value of the color detected at the color detection unit based on the color coordinates stored in the storage unit, and using the measured color coordinate value, providing the display apparatus with an alignment value for aligning a color wheel index.

2. A color wheel index aligning apparatus for a display apparatus having a color wheel as a color separator, comprising:
   means for supplying a predetermined image signal to the display apparatus, the predetermined image signal being processed at the display apparatus and output to a screen;
   means for detecting the color of an image signal output to the screen;
   means for storing color coordinates with respect to red, green and blue colors; and
   means for measuring a color coordinate value of the color detected at the color detection means based on the color coordinates stored in the storage means, and using the measured color coordinate value, providing the display apparatus with an alignment value for aligning a color wheel index.

3. The color wheel index aligning apparatus of claim 1, wherein the signal supply unit supplies at least one of the image signal of red, green and blue colors, and
   the control unit adjusts the alignment value based on the color coordinate value of one of the image signals of red, green and blue colors being supplied from the signal supply unit.

4. The color wheel index aligning apparatus of claim 1, wherein the control unit compares a first color coordinate value with respect to the color of the image signal currently output to the screen and a second color coordinate value with respect to the color of the image signal previously output to the screen, and when the first color coordinate value is equal to, or greater than the second color coordinate value, the control unit increases and decreases the alignment value and provides the display apparatus with the alignment value.

5. The color wheel index aligning apparatus of claim 4, wherein the display apparatus comprises:
   an image signal processor for processing the supplied predetermined image signal into R, G and B color signals and outputting the processed R, G and B color signals; and
   a system control unit for controlling an output timing of the R, G and B color signals from the image signal processor, wherein
   the system control unit controls the image signal processor to increase and decrease the delay time of the output timing for the R, G and B color signals in correspondence with the increased and decreased alignment value provided from the control unit.

6. An alignment method of a color wheel index aligning apparatus which is for a display apparatus having a color wheel as a color separator, comprising:
   a signal supply step for supplying a predetermined image signal to the display apparatus;
   display step for processing the predetermined image signal and outputting the processed signal to a screen of the display apparatus;
   color detection step for detecting the color of the image signal output to the screen of the display apparatus;
   adjusting step for measuring the color coordinate value of the color detected in the color detection step based on the pre-stored color coordinates, and using the measured color coordinate value, aligning and adjusting an alignment value for aligning a color wheel index; and
   a providing step for providing the display apparatus with the alignment value adjusted in the adjusting step.

7. An alignment method of a color wheel index aligning apparatus which is for a display apparatus having a color wheel as a color separator, comprising:
   supplying a predetermined image signal to the display apparatus;
   processing the predetermined image signal and outputting the processed signal to a screen of the display apparatus;
   detecting the color of the image signal output to the screen of the display apparatus;
   measuring the color coordinate value of the color detected in the color detection step based on the pre-stored color coordinates, and using the measured color coordinate value, aligning and adjusting an alignment value for aligning a color wheel index; and
   providing the display apparatus with the alignment value adjusted in the adjusting step.

8. The alignment method of claim 6, wherein the signal supply step supplies at least one of the image signal of red, green and blue colors, and
   the adjusting step adjusts the alignment value based on the color coordinate value of one of the image signal of red, green and blue colors being supplied in the signal supply step.

9. The alignment method of claim 6, wherein the adjusting step comprises:
   a comparing step of comparing a first color coordinate value with respect to the color of the image signal currently output to the screen and a second color coordinate value with respect to the color of the image signal previously output to the screen; and
   increasing/decreasing step of, when the first color coordinate value is equal to, or greater than the second color coordinate value, increasing and decreasing the alignment value.

10. The alignment method of claim 9, wherein the display step comprises an output step of processing the supplied predetermined image signal into R, G and B color signals, and outputting the processed R, G and B color signals, and
    the output step increases and decreases the delay time of the output timing for the R, G and B color signals in correspondence with the increase and decrease of the alignment value.

* * * * *